United States Patent
Eagerton (10) Patent No.: US 10,745,820 B2
(45) Date of Patent: Aug. 18, 2020

(54) METHOD OF MIRROR COATING AN OPTICAL ARTICLE AND ARTICLE THEREBY OBTAINED

(71) Applicant: ESSILOR INTERNATIONAL (COMPAGNIE GENERALE D'OPTIQUE), Charenton-le-Pont (FR)

(72) Inventor: William Eagerton, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 150 days.

(21) Appl. No.: 15/540,696

(22) PCT Filed: Jun. 8, 2015

(86) PCT No.: PCT/IB2015/001183
§ 371 (c)(1),
(2) Date: Jun. 29, 2017

(87) PCT Pub. No.: WO2016/108077
PCT Pub. Date: Jul. 7, 2016

(65) Prior Publication Data
US 2017/0356097 A1    Dec. 14, 2017

Related U.S. Application Data

(60) Provisional application No. 62/098,966, filed on Dec. 31, 2014.

(51) Int. Cl.
*C25D 7/08* (2006.01)
*B29D 11/00* (2006.01)
(Continued)

(52) U.S. Cl.
CPC .......... *C25D 7/08* (2013.01); *B29D 11/00596* (2013.01); *B29D 11/00923* (2013.01);
(Continued)

(58) Field of Classification Search
CPC ............... C25D 5/18; C25D 5/54; C25D 5/56
See application file for complete search history.

(56) References Cited

U.S. PATENT DOCUMENTS 3,873,339 A * 3/1975 Hudson .................. C03B 19/14
427/452
5,529,947 A * 6/1996 Okonogi ................. H01L 21/76
257/E21.54

(Continued)

FOREIGN PATENT DOCUMENTS

| CN | 1637166 | 7/2005 |
| CN | 101782663 | 7/2010 |

(Continued)

OTHER PUBLICATIONS

International Search Report, dated Dec. 18, 2015, from corresponding PCT application.
(Continued)

*Primary Examiner* — Brian W Cohen
(74) *Attorney, Agent, or Firm* — Young & Thompson (57) ABSTRACT

A method and system for manufacturing an optical article is provided. The method may comprise providing at least one ophthalmic lens substrate having a surface; applying at least one conductive coating on at least a portion the ophthalmic lens substrate; and electroplating the ophthalmic lens substrate to form a plating layer that is in a contacting relationship with the conductive coating of the optical article. Other layers may also be applied.

8 Claims, 3 Drawing Sheets

(51) Int. Cl.

| | | |
|---|---|---|
| *C25D 5/06* | (2006.01) | |
| *C25D 11/24* | (2006.01) | |
| *C23C 18/16* | (2006.01) | |
| *C23C 18/31* | (2006.01) | |
| *C25D 5/34* | (2006.01) | |
| *C25D 5/18* | (2006.01) | |
| *C25D 5/56* | (2006.01) | |
| *C25D 11/04* | (2006.01) | |

(52) U.S. Cl.
 CPC ............ *C23C 18/165* (2013.01); *C23C 18/31* (2013.01); *C25D 5/06* (2013.01); *C25D 5/34* (2013.01); *C25D 11/246* (2013.01); *C25D 5/18* (2013.01); *C25D 5/56* (2013.01); *C25D 11/04* (2013.01); *C25D 11/243* (2013.01)

(56) References Cited

U.S. PATENT DOCUMENTS

| | | | |
|---|---|---|---|
| 5,741,831 A | 4/1998 | Keita et al. | |
| 6,036,833 A * | 3/2000 | Tang | C25D 3/12 205/103 |
| 6,071,398 A * | 6/2000 | Martin | C25D 3/38 205/103 |
| 8,215,766 B2 | 7/2012 | Nishimoto et al. | |
| 8,513,124 B1 * | 8/2013 | Ponnuswamy | C25D 7/123 257/E21.575 |
| 8,641,884 B2 | 2/2014 | Hayashi et al. | |
| 8,789,944 B2 | 7/2014 | Nishimoto et al. | |
| 2004/0071424 A1 * | 4/2004 | Hiraka | G02B 6/02042 385/129 |
| 2004/0104111 A1 * | 6/2004 | Ohgaki | B29D 11/00278 204/198 |
| 2005/0141830 A1 * | 6/2005 | Peret | C03C 25/48 385/94 |
| 2009/0183992 A1 * | 7/2009 | Fredenberg | B81C 99/0085 205/82 |

FOREIGN PATENT DOCUMENTS

| | | |
|---|---|---|
| CN | 102346266 | 2/2012 |
| CN | 202372656 | 8/2012 |
| CN | 103676201 | 3/2014 |
| EP | 2 209 023 | 7/2010 |
| EP | 2 405 036 | 1/2012 |
| FR | 2 734 827 A1 | 12/1996 |
| JP | 2000 056108 A | 2/2000 |
| JP | 2004-341052 | 12/2004 |
| KR | 2009-0084416 A | 8/2009 |
| WO | 97/20246 A1 | 6/1997 |

OTHER PUBLICATIONS

Chinese Office Action for Application No. 201580071724.8, dated Nov. 16, 2018.
European Office Action for Application No. 15 781 702.4, dated Feb. 12, 2019.
Chinese Office Action for Application No. 201580071724.8 dated Jun. 19, 2019 with English translation provided.

* cited by examiner

METHOD OF MIRROR COATING AN OPTICAL ARTICLE AND ARTICLE THEREBY OBTAINED

CROSS-REFERENCE TO RELATED APPLICATIONS

This application claims benefit and priority to U.S. Provisional Application No. 62/098,966 filed Dec. 31, 2014, the disclosure of which is incorporated by reference herein in its entirety.

BACKGROUND

Field of the Disclosure

The present disclosure relates generally to a method of mirror coating an optical article. More particularly, this present disclosure pertains to a method of electroplating an ophthalmic lens, among other features.

Related Art

Vacuum evaporation coating is a process that is commonly used to produce mirror coatings on ophthalmic lenses. During this process, within a high vacuum chamber, an electron beam is focused onto optically clear materials, such as silicon, zirconium and titanium oxides. These materials evaporate and then adhere to the surface of lenses suspended on racks within the coating chamber. The coating process requires lenses to be meticulously cleaned using a multi-step process that includes ultrasonic cleaning machines and heat drying to remove any moisture from the lenses. Other expensive materials can be used as well. Also, the coating chambers are large, expensive and complex.

This process can be disadvantageous because it requires the use of a vacuum chamber and the use of large quantities of expensive materials, such as gold and silver. These requirements cause precious resources and equipment to be used. Also, in the standard electroplating process using physical vapor deposition (PVD), there can be little control over what is coated.

There is a need for an alternative method of mirror coating a lens that addresses these problems. Presented herein is a method of electroplating a lens that does not require the use of a vacuum chamber and uses fewer amounts of expensive materials.

Electroplating is a process that uses electrical current to reduce dissolved metal cations so that they form a coherent metal coating on an electrode. Similar processes are called electrodeposition or pulse electroplating. The part to be plated is typically the cathode of the circuit. In one technique, the anode can be made of the metal to be plated on the part. Both components are immersed in a solution containing one or more dissolved metal salts as well as other ions that permit the flow of electricity. A power supply supplies a direct current to the anode, oxidizing the metal atoms that comprise it and allowing them to dissolve in the solution. At the cathode, the dissolved metal ions in the electrolyte solution are reduced at the interface between the solution and the cathode, such that they "plate out" onto the cathode. The rate at which the anode is dissolved is equal to the rate at which the cathode is plated, vis-a-vis the current flowing through the circuit. In this manner, the ions in the electrolyte bath are continuously replenished by the anode. Other electroplating processes may use a non-consumable anode such as lead or carbon. In these techniques, ions of the metal to be plated must be periodically replenished in the bath as they are drawn out of the solution.

The electroplating process presented herein is customized for ophthalmic lens mirror coating and allows a lens substrate to be selectively coated, so there is no waked material. The process presented herein also allows for the use of less complex and expensive equipment as well as the use of fewer expensive materials. This process can be used for any type of ophthalmic lens.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

SUMMARY OF THE DISCLOSURE

In one aspect, a method is provided for manufacturing an optical article, wherein the method comprises providing at least one ophthalmic lens substrate having a surface; applying at least one conductive coating on at least a portion of the surface of the ophthalmic lens substrate; and electroplating the ophthalmic lens substrate to form a plating layer that is in a contacting relationship with the conductive coating of the optical article. The method may further comprise one or more of the following steps before applying the first conductive coating: de-greasing the lens substrate; pre-etching the lens substrate; etching the lens substrate; rinsing the lens substrate; and applying a $SiO_2$ layer. The method may further comprise applying a second $SiO_2$ layer after applying the at least one conductive coating for providing improved adhesion with a subsequent layer. A subsequent layer may comprise at least one of: a fog-resistant coating, a smudge-resistant coating and a Teflon-based coating.

In one aspect, an ophthalmic article is provided comprising: an ophthalmic lens substrate having a surface; a first conductive layer formed on at least a portion of the optical substrate; and a second plating layer formed on the substrate such that it has a contacting relationship with the first layer, wherein the second plating layer is deposited by at least one of the group comprising: electroplating, electroless deposition, pulse electroplating, and brush coating. The first conductive layer may be light-transmissive. The second plating layer may be light-transmissive. The first conductive layer may comprise at least one transition metal or post transition metal. The first conductive layer may comprise any one of the group comprising: indium tin oxide (ITO), titanium, chromium, iron, nickel, copper, zinc, rhodium, palladium, silver, tantalum, tungsten, platinum, gold, aluminum, gallium, indium, tin, thallium, lead, bismuth, and combinations thereof. The first conductive coating and the plating layer may comprise a mirror coating. The first conductive layer may be formed directly on at least a portion of the optical substrate.

In one aspect, an ophthalmic article is provided comprising: an ophthalmic lens substrate having a surface, a $SiO_2$ layer applied on the surface of the ophthalmic lens, a first conductive layer formed on the $SiO_2$ layer, and a second plating layer formed on the first conductive layer such that it has a contacting relationship with the first conductive layer, wherein the second plating layer is deposited by at least one of the group comprising: electroplating, electroless deposition, pulse electroplating, and brush coating.

In one aspect, a system for electroplating an ophthalmic lens substrate is provided wherein the system comprises: an immersion bath comprising at least one electroplating solution, at least one ophthalmic lens substrate, wherein the substrate is immersed in the immersion bath; a cathode configured to be at least partially immersed into the immersion bath; and an anode configured to be at least partially immersed into the immersion bath and operably connected to the lens substrate.

BRIEF DESCRIPTION OF THE DRAWINGS

The advantages, nature, and various additional features as described herein will appear more fully upon consideration of the illustrative embodiments now to be described in detail in connection with the accompanying drawings. In the drawings like reference numerals denote similar components throughout the views.

DETAILED DESCRIPTION OF THE DISCLOSURE

The words or terms used herein have their plain, ordinary meaning in the field of this disclosure, except to the extent explicitly and clearly defined in this disclosure or unless the specific context otherwise requires a different meaning.

If there is any conflict in the usages of a word or term in this disclosure and one or more patent(s) or other documents that may be incorporated by reference, the definitions that are consistent with this specification should be adopted.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values, and including the values "a" and "b" themselves.

Terms such as "first," "second," "third," etc. may be assigned arbitrarily and are merely intended to differentiate between two or more components, parts, or steps that are otherwise similar or corresponding in nature, structure, function, or action. For example, the words "first" and "second" serve no other purpose and are not part of the name or description of the following name or descriptive terms. The mere use of the term "first" does not require that there be any "second" similar or corresponding component, part, or step. Similarly, the mere use of the word "second" does not require that there be any "first" or "third" similar or corresponding component, part, or step. Further, it is to be understood that the mere use of the term "first" does not require that the element or step be the very first in any sequence, but merely that it is at least one of the elements or steps. Similarly, the mere use of the terms "first" and "second" does not necessarily require any sequence. Accordingly, the mere use of such terms does not exclude intervening elements or steps between the "first" and "second" elements or steps, etc.

Herein, the term "lens" means an organic or inorganic glass lens, preferably an organic lens, comprising a lens substrate having one or more surfaces which may be coated with one or more coatings of various natures. As used herein, "lens blank" means a transparent medium of a known base curve, with no power, used by optical laboratories, to generate a finished spectacle lens with prescribed powers; it is used for single vision, bi- and tri-focals, and progressive additional lenses (PALS).

Figure 1:
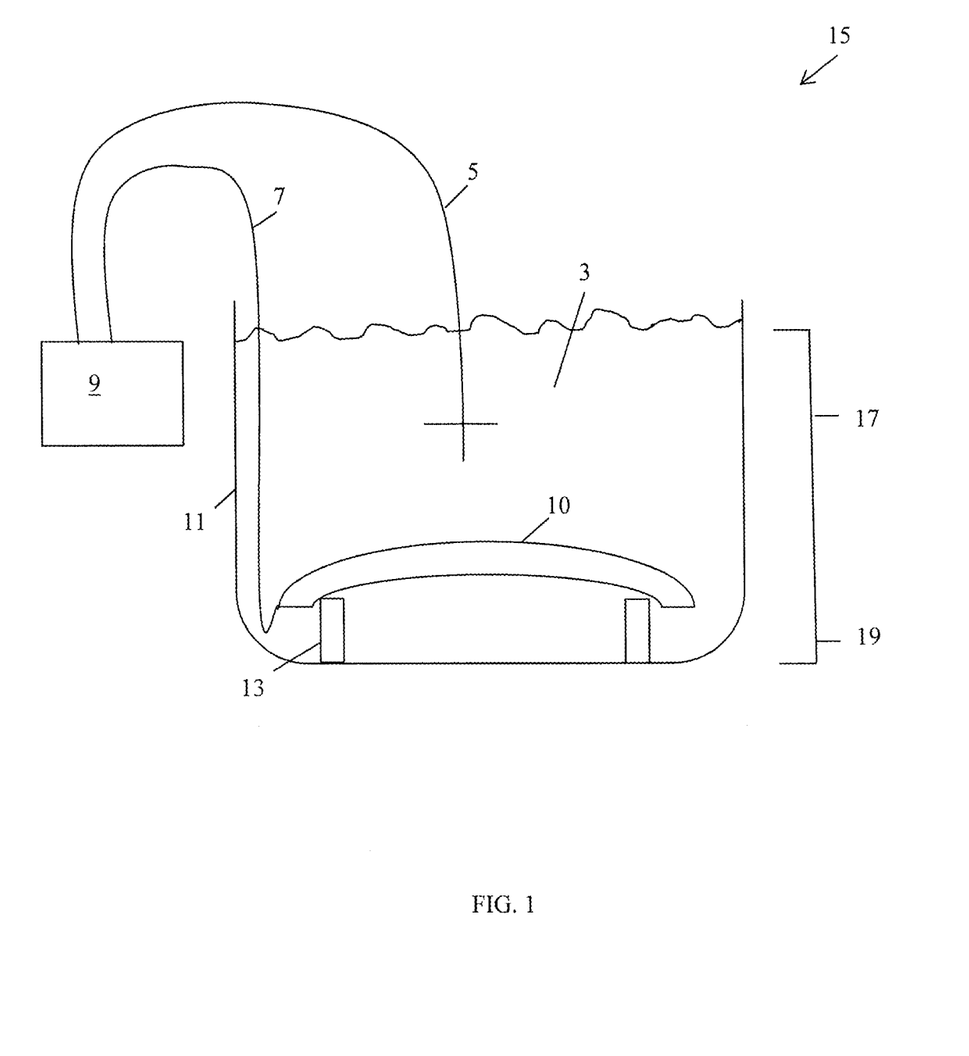
FIG. 1 illustrates an electroplating system, configured according to principles of the disclosure.

Referring to FIG. 1, an electroplating system 15 is illustrated, configured according to principles of the disclosure. The electroplating system comprises a container, such as a beaker 11, for example. The beaker 11 contains an immersion bath 3 into which an ophthalmic lens substrate 10 is immersed. The electroplating (or electrodeposition) system 15 uses an electrical current to reduce dissolved metal cations so that they form a coherent metal coating on an ophthalmic lens substrate 10.

As used herein, an optical element, such as a spectacle lens, formed of a plastic optical base, can be used as the lens substrate 10. The system and process used herein can be used for any type of ophthalmic lens, i.e., spectacle lenses, sunglasses, and the like. In one illustrative embodiment, substrates such as those obtained by (co)polymerizing diethylene glycol bis allyl carbonate, sold, for example, under the trade name CR-39 ® by the PPG Industries company (ORMA® lenses from ESSILOR), or by polymerizing thio (meth)acrylic monomers, such as those described in the French patent application FR 2734827, or polythiourethanes, can be used. Such substrates may be obtained by polymerizing mixtures from these monomers, or they may also comprise mixtures from these polymers and (co)polymers. In other embodiments other types of suitable resin substrates 10 may be used. In some embodiments, the lens substrate 10 to be electroplated may comprise an antireflection (AR) coating having a multilayer configuration including a transparent conductive layer.

The lens substrate 10 is positioned such that at least a portion of the lens substrate 10 is substantially received by a lens support 13. The lens is positioned within the beaker 11 on top of a lens mount or orientation ring. This provides a resting place for the at least one lens substrate 10 and helps to keep the at least one lens substrate 10 in place. Although lens support 13 is configured as an orientation ring that is positioned at a bottom portion 19 of the beaker 11, other embodiments of the lens support 13 can be contemplated for receipt and positioning of the lens substrate 10 within the immersion bath 3. In one embodiment, as illustrated, the lens, having a concave surface and a convex surface, can be positioned in relationship to the lens support 13 such that the convex surface of the lens faces toward the top portion 17 of the beaker 11 and the concave surface of the lens substrate 10 faces toward the lens support 13. Other configurations of the lens substrate 10 in relationship to the lens substrate 13 may be possible. The surface of the at least one lens substrate 10 facing upward toward the cathode 5 is not insulated.

The positioning and orientation of the lens substrate 10 is an important part of the electroplating process. The orientation of the at least one lens substrate 10 in relationship to the cathode 5 can directly affect the amount and distribution of the plating layer onto a surface of the lens substrate 10. Specifically, the orientation of the at least one lens substrate 10 in relationship to the cathode 5 and the anode 7 during electroplating can affect the amount and the distribution of the deposition of materials onto the at least one lens substrate 10. For example, in the illustrated embodiment the cathode 5 can be positioned such that it remains in a substantially centered position over the at least one lens substrate 10 during the electroplating process. In one embodiment the lens substrate 10 can be positioned adjacent to the cathode 5. In another embodiment the lens substrate 10 can be positioned adjacent and parallel to the cathode 5. Other factors that can affect the amount and pattern of deposition of the lens can include the amount of silver or other metal being used to plate the at least one lens substrate 10, and the curvature of the lens substrate 10.

A power supply 9 is operable to supply a direct current to anode 7, to oxidize the metal atoms that comprise it, allowing them to dissolve in the immersion bath 3. The anode 7 is at least partially immersed into the immersion bath and is operably coupled to the lens substrate 10. The cathode 5 of the system 15 is at least partially immersed into the immersion bath and is positioned substantially centrally in the immersion bath 3 above the lens substrate 10 in the immersion bath 3. The cathode 5 may comprise any conductive metal, such as, but not limited to, copper, gold, platinum, silver, tin, and aluminium. At least a portion of anode 7 is insulated. As described above, the rate at which the anode 7 is dissolved is substantially equal to the rate at which the cathode 5 is plated. In this manner, the ions in the electrolyte immersion bath 3 are continuously replenished by the anode 7.

Figure 2:
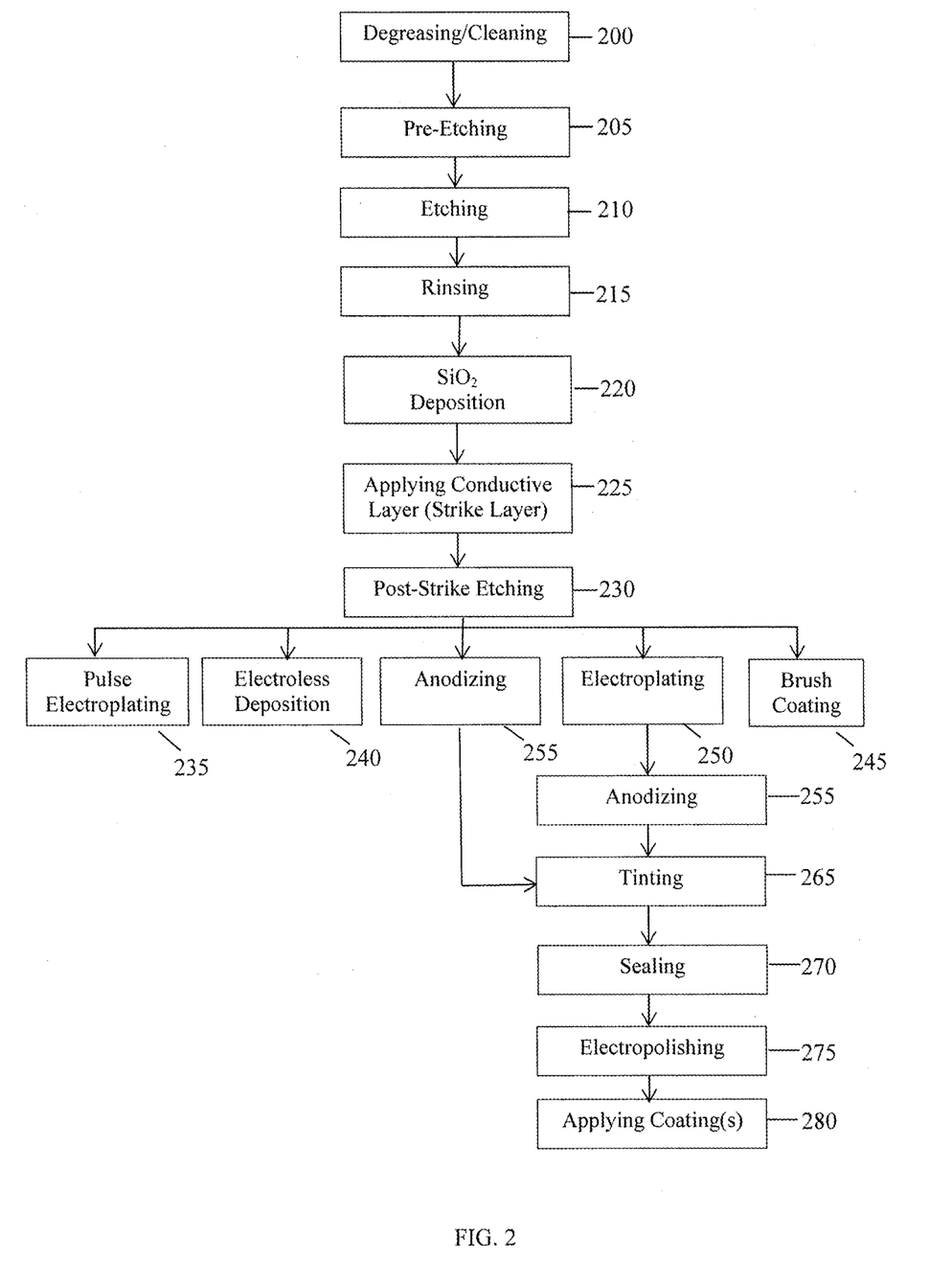
FIG. 2 illustrates a process of electroplating a lens, the steps performed according to principles of the disclosure.

Referring to FIG. 2, a process of electroplating a lens substrate 10 is illustrated, the steps performed according to principles of the disclosure. Before an ophthalmic lens substrate 10 is electroplated, an ophthalmic lens substrate 10 may be subject to one or more pre-treatment steps. These steps involve 1) degreasing the lens substrate; 2) etching the lens substrate, and 3) striking the lens substrate.

Degreasing (Step 200)

The ophthalmic lens substrate 10 can be subject to a degreasing step before electroplating the ophthalmic lens substrate 10. Degreasing means any cleaning process that uses a degreaser or similar product to remove oils and other oil-based materials, such as oil-based inks, from a lens surface, from a lens substrate 10 for the electroplating process. Cleaning means any cleaning process that removes dust, dirt, and other contaminates to the lens substrate 10 for the electroplating process. Any lens cleaning process can be used prior to electroplating. In an illustrative embodiment, a dip-line cleaning process can be used, such as that known in the art. Other cleaning processes can be contemplated by those skilled in the art.

Pre-Etching (Step 205)

The plastic substrates 10, such as those described above, can be difficult to etch, so an ophthalmic lens substrate 10 may be subject to a pre-etching step. Pre-etching the lens substrate 10 may involve swelling a skin layer or a crystal-oriented layer on the surface of the substrate 10 using an organic solvent or high polarity solvent, such as, but not limited to, dimethyl sulfoxide. The pre-etching treatment can enhance the etching effect. Substrates 10 containing inorganic materials, glass fibers, and the like, can be treated by conventional etching methods selected from those known in the art.

Etching (Step 210)

The lens substrate 10 is then subjected to an etching process to make the surface of the lens substrate 10 substantially rough. Etching means any process that involves the use of at least one of chemical, ionic, or electrical energy to etch a surface of a lens substrate 10 to produce a roughness of the lens of less than about 20 nm. The purpose of the etching process is to provide a surface that provides sufficient adhesion and a chemical bond for the strike layer 310, described below. This can be done by exposure of the lens substrate 10 to an ultrasonic bath with a corrosive material such as hydroxide, sodium potassium hydroxide, bleach, ozone, or a strong acid or base solution, for example, less than about 20% by volume of solution. The lens substrate 10 can also be exposed or treated to a strong oxidizer, a corona discharge, a gridless ion gun, or a combination thereof of such treatments. The etching process is useful for producing a charge to the surface of the lens substrate 10 that allows for better adhesion of hard coatings. While application of a hard coating is not required for the electroplating process, such coating does not interfere with the electroplating process either. In one aspect, the final product produced by electroplating may comprise at least one scratch-resistant coating on the concave surface of the at least one lens substrate 10, preferably applied before electroplating. Hard coating means any organic, inorganic, or hybrid wet coating, such as those made commercially available by Essilor for the benefit of scratch-resistance.

Rinsing (Step 215)

After etching, the substrate 10 is subjected to a rinsing process to remove the etching solution, such as chromic acid or the like, that may remain on the surface of the substrate 10. The chromic acid can be removed from the surface of the lens substrate when cleaning is effected using a diluted solution of hydrochloric acid or a solution containing a reducing agent such as sodium bisulfite.

$SiO_2$ Deposition Layer (Step 220)

The substrate 10 may be subjected to deposition of silicon dioxide ($SiO_2$). The deposition may be accomplished by a physical vapor deposition (PVD) process, a chemical vapor deposition (CVD) process or thermal evaporation process. A $SiO_2$ layer 305 (FIG. 3A, 3B) may be formed having a thickness from about 75 nm to about 150 nm. The deposition of $SiO_2$ preferably occurs at a pressure between about 1E-2 and 2E-3 Pascals. The $SiO_2$ layer 305 acts as an intermediate layer between the substrate 10 and the strike layer 310 which provides for good adhesion of the strike layer 310. Although the $SiO_2$ layer 305 significantly improves adhesion of the strike layer 310 with the substrate 10, in some embodiments, the $SiO_2$ layer may be omitted.

Application of Strike Layer (Step 225)

After the lens substrate 10 has been cleaned and $SiO_2$ deposition layer 305 applied, at least one strike layer 310 is applied on the $SiO_2$ layer of the lens substrate 10 to form a foundation for subsequent electroplating. As used herein, strike layer 310 means a layer of conductive material that is compatible with the substrate 10 and with desired plating material(s). As used herein, plating layer(s) or plating materials mean the layer(s) or materials deposited as a result of the electroplating process, or similar processes, described herein, such as pulse electroplating and the like. More than one strike layer may be applied. In some applications, the strike layer 310 may be applied directly to the lens substrate 10 without an intervening $SiO_2$ layer.

The strike layer acts as an intermediary layer between the lens substrate 10 and successive plating layers. The strike layer 310 is capable of adhering to the lens substrate 10 and helps to ensure adequate adhesion of successive plating material layers to the substrate 10. The strike layer is designed to have suitable compatibility and adhesion to both the substrate 10 and the electroplating layer. The strike layer provides conductivity for antistatic, electromagnetic shielding, and other purposes. If certain plating metals have an inherently poor adhesion to the lens substrate 10, a strike layer that is compatible with both the lens substrate 10 and the plating layer, can be first deposited onto the lens substrate 10. For example, electrolytic nickel on zinc alloys may have poor adhesion to a lens substrate 10. In this case a strike layer comprising copper could be applied to the lens substrate 10, which layer has a sufficiently good adherence to both the lens substrate 10 and the electroplated layer.

Application of the strike layer 310 can be performed by physical vapor deposition (PVD), chemical vapor deposition (CVD), sputtering within a vacuum chamber, dip coating, or spin coating. In one embodiment a strike layer 310 can be deposited to form a layer with a predetermined or desired target thickness at a predetermined or desired rate (nm/sec), while at a starting vacuum of 3E-3 Pascals. The strike layer can also be applied as a conductive transparent varnish. Yet another method of applying a conductive transparent strike layer would be to imbibe a transparent coating with a conductive material ("imbibition"), such as those disclosed herein.

The strike layer 310 may comprise, but is not limited to, any transition metal, post-transition metal, any solid solution containing a metal (metallic solid solution), or conductive carbon allotrope. Transition metal means any element or alloy of elements in the d-block of the periodic table (Groups 3 through 12). Transition metals may include, but are not limited to, titanium, chromium, iron, nickel, copper, zinc, rhodium, palladium, silver, tantalum, tungsten, platinum, and gold. Post-transition metals mean elements in groups 13-15, in between transition metals and metalloids. Post-transition metals can include aluminum, gallium, indium, tin, thallium, lead, and bismuth. Metallic solid solution means metallic solutions used in the electroplating process. They may also be called plating solutions, metallic salts, metallic suspensions, colloids, and colloidal metals, such as, but not limited to, colloidal silver or colloidal gold. The strike layer 310 may comprise any one of the group comprising: indium tin oxide (ITO), titanium, chromium, iron, nickel, copper, zinc, rhodium, palladium, silver, tantalum, tungsten, platinum, gold, aluminum, gallium, indium, tin, thallium, lead, and bismuth, and combinations thereof.

Other examples of conductive strike layers could be copper or nickel and carbon allotropes, such as carbon nanotubes (CNTs). Conductivity can alternatively be provided by forming a thin layer made of gold, silver, or any other suitable metal. Layers formed on a surface of a base of a spectacle lens, such as an antireflection (AR) coating, a hard-coated layer, and an antifouling layer, are primarily made of a silicon-based compound or oxide in many cases, and the metal layers described above typically do not have a strong affinity with the silicon-based layers.

In another illustrative embodiment, aluminum or tin can be applied as the strike layer 310 and/or the electroplating process described herein. Aluminum is commonly used in mirror coatings. Aluminium is advantageous because it is capable of retaining its reflectance in finely powdered form. Aluminum mirror finish has the highest reflectance of any metal in the 200-400 nm ultraviolet and the 3000-10000 nm infrared spectral ranges. However, its reflectance in the 400-700 nm visible range is slightly lowered compared to silver and tin and in the 700-3000 nm near infrared when compared to silver, gold and copper. Despite its advantages, aluminum can become tarnished due to oxidation. Oxidation of aluminum is caused when it naturally reacts with air, creating a barrier oxide layer, which effectively reduces nominal reflectance. To maintain optical integrity of any aluminum coating used herein, it can be treated with a protective coating.

In one illustrative embodiment, the electrically conductive strike layer 310 may comprise a metal oxide selected from indium, tin, and zinc oxide, as well as mixtures thereof. Particularly, the conductive strike layer 310 can be made of an inorganic oxide containing any one of indium, tin, zinc, and other elements or two or more of the elements. More particularly, ITO (indium tin oxide: a mixture of indium oxide and tin oxide) can be used. For example, indium tin oxide ($In_2O_3$:Sn, i.e., indium oxide doped with tin) and tin oxide ($In_2O_3$) can be used. The ITO can be applied as indium tin oxide—a solid solution of indium(III) oxide ($In_2O_3$) and tin(IV) oxide ($SnO_2$), for example, 90% $In_2O_3$, 10% $SnO_2$ by weight, that can be typically transparent and colorless in thin layers and can serve as a metal-like mirror in the infrared region of the electro-magnetic spectrum. ITO is a widely-used transparent conducting oxide due to its electrical conductivity and optical transparency. An ITO conductive strike layer is advantageous because it provides optically clear transparency and antistatic properties. Thin films of indium tin oxide are most commonly deposited on surfaces by electron beam evaporation, physical vapor deposition, and/or a range of sputter deposition techniques. Other techniques, such as, but not limited to, methods other than PVD may be used to apply the ITO, such as, for example, CVD, or chemical immersion, for example.

In an exemplary embodiment, the strike layer 310 can be less than about 0.1 μm thick. One of skill in the art will realize that other thicknesses of the strike layer 310 can be contemplated. In other embodiments, the thickness of the strike layer 310 can vary from about 0.1 nm to about 150 nm, more particularly from about 0.1 nm to about 50 nm, depending on the nature of the strike layer. When the strike layer 310 is less than about 0.1 nm thick, the strike layer may not have sufficient electrical conductivity. When the strike layer 310 is more than about 150 nm thick, it does not typically enable the required transparency and low absorption characteristics. The electrically conductive layer is preferably made of an electrically conductive and highly transparent material. In that case, its thickness can vary from about 0.1 nm to about 30 nm, more particularly, from about 1 nm to about 20 nm, and even more particularly, from about 1 nm to about 10 nm. The strike layer 310 comprises a substantially uniform thickness.

Post-Strike Etching (Step 230)

In one optional step, post-strike etching of the at least one lens substrate 10 can be used to roughen the strike layer 310, thereby allowing better adhesion of the subsequent electroplating layer(s) to the strike layer 310. The post-strike etching process can be completed to help prevent any damage to the strike layer. In one illustrative embodiment, to carry out this process, a gridless ion source such as an ion gun, as described above, can be used at the following settings: anode voltage: about 100 Volts; anode current: about 0.60 amps; and neutral current: about 0.080 amps. The emission current can be adjusted for the correct neutral current set-point. During this process, argon gas can be applied as the ionized gas. The volume of argon gas is automatically adjusted for the correct emission current. The treatment time for this part of the post-strike etching process can be about two (2) minutes.

In some embodiments a second step of post-strike etching can be carried out. This step can comprise a chemical etching process using, for example, an activator, such as, but not limited to, an acidic or basic solution for less than about 2 minutes. In one embodiment NaOH solution can be used at a concentration of less than about 5% for between about 1 minute and about 3 minutes. This second chemical etching step may be required to remove any oxidized layers of aluminum from the strike layer. To be effective, the chemical etching step is done immediately before electroplating begins. After the chemical etching step, a rinsing step is carried out to remove contaminants.

Electroplating (Step 250)

The lens substrate 10 can then be subject to an electroplating process. Electroplating means any process using an anode, cathode, electroplating material or solution, and a substrate to which an electroplating material may adhere, using a reduction by an electric current. Electrodeposition is another term for electroplating, as described above.

The electroplating process described herein involves providing an optical element, such as an ophthalmic lens substrate 10, immersing the ophthalmic lens substrate 10 into a 1-2 L immersion bath 3, and electroplating the lens substrate 10 such that it comprises a plating layer 315 of a desired thickness, as described above. During this process the at least one lens substrate 10 comprising the strike layer functions as the cathode 5 via an insulated cable connection. An anode 7 can be composed of the same material as the plating solution, such as, for example, gold, rhodium, and the like, or can be made of a generally non-reactive material such as stainless steel, graphite, or platinum. The plating time as used herein, means the time required to deposit a desired material at a desired thickness onto at least a portion of a lens substrate 10. The plating time can take anywhere from 15 seconds to 30 minutes, depending on the desired material density and thickness required on the at least one lens substrate 10. To carry out the electroplating procedure, about 30 V at 400 mA can be applied from the power source 9 to the electroplating system 15 for between about 30 minutes and about 45 minutes. In other embodiments, a voltage ranging from about 1 V to about 14 V DC at a current of between about 0.10 A to about 4 A can be applied to the cathode 5 and anode 7 to promote the plating process. Other combinations of power and time that can be applied may cause electrolysis. Electrolysis is the use of electric current to stimulate a non-spontaneous reaction. In electrolysis, an electric current is sent through an electrolyte and into solution in order to stimulate the flow of ions necessary to run an otherwise non-spontaneous reaction. Because the immersion or plating bath 3 is an aqueous solution, electrolysis of water with evolution of hydrogen can present a competing reaction at the cathode. The hydrogen formed may itself present problems, such as hydrogen embrittlement of the deposited metal coating or interference with the metal deposition caused by bubbles. The removal of hydrogen, with concomitant formation of OH— ions, also increases the pH of the plating solution adjacent to the surface of the cathode. A high pH in the plating layer may also produce problems such as formation of insoluble metal hydroxide layers on the cathode surface which also interfere with the transportation of the metal-bearing ions and the deposition of metal atoms on the surface.

The immersion bath 3 may comprise an electroplating solution comprised of de-ionized (DI) water and a strong electrolyte, such as an acid solution. For example, sulphuric acid ($H_2SO_4$) may be used for the plating solution. The presence of sulphuric acid within the DI water can help to produce a substantially uniform electroplated layer onto the lens substrate 10. During the electroplating process the DI water can be at about room temperature in the beaker or container 11. The immersion bath can be from about 40° C. to about 80° C.

Figure 3A:
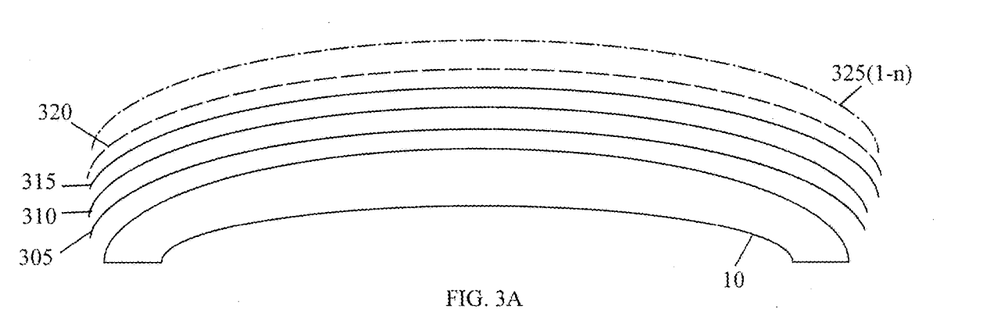
FIG. 3A shows an example of a lens substrate and various layers, configured according to principles of the disclosure.

The electroplating layer or plating layer 315 may comprise any transition metal, post-transition metal, or metal alloy. For example, the plating layer 315 may comprise, but is not limited to, gold, silver, chrome, nickel, and/or rhodium.

Any suitable thickness of plating layer 315 can be deposited onto the lens substrate 10 using the electroplating process. The thicknesses of the final plating layer may vary from one material to the next. The thickness of the plating layer is related to the power as represented by the formula below.

The final thickness of the electroplated layer or plating layer 315 is defined by a modified version of Faraday's Law:

$$W = \frac{I*T*A}{N*F}$$

Where: W=Weight of plated metal in grams
I=Current in Coloumbs per second
T=Time in seconds
A=Atomic weight of the plating metal in grams per mole.
N=Valence of the dissolved metal in solution in equivalents per mole.
F=Faradays constant in Coloumbs per equivalent. F=96,485.309 Coloumbs/equivalent.
Weight can be converted to thickness by:

$$T = \frac{W*10,000}{rho*S}$$

Where:
T=Thickness in Microns
Rho=Density in grams per cubic centimeter
10,000 as a constant to convert centimeters to microns Variations of the Electroplating process can be carried out. Such processes can include, but are not limited to, electroless deposition, pulse electroplating, and brush coating.

Pulse Electroplating (Step 235)

In another illustrative embodiment, pulse electroplating can be used to coat a lens substrate 10, described herein. Pulse electroplating is a process very similar to standard immersion electroplating to provide a plating layer 315, but with a varying voltage and/or current strength for the benefit of altering the densities of plating layers, as desired. Pulse electroplating differs from immersion electroplating, described above, in that the intensity of the voltage or current applied during the process may shift at different stages of the pulse electroplating process. This is done to promote a stronger overall plating, compared to plating produced by the immersion electroplating process, by having several layers of material at ranging densities. Pulse electroplating can be useful for thick plates.

Electroless Deposition/Auto Catalytic Deposition (Step 240)

In yet another illustrative embodiment, the at least one lens substrate 10 described herein can be coated using an electroless deposition process. For this process, an acid is added to the immersion bath 3 instead of an external power source. The acid concentration may be adjusted to adjust the plating speed and density of the layers coated onto the at least one lens substrate 10, instead of adjusting the voltage and/or current. Electroless deposition is a form of electroplating to provide a plating layer 315 where the energy required for reduction by an electric current is gained from an electrolyte within the electroplating solution instead of from an outside power source.

Brush Coating/Brush Deposition (Step 245)

In yet another illustrative embodiment, brush deposition can be used to coat the at least one lens substrate 10. As used herein, brush coating means an electroplating process to provide a plating layer 315 that utilizes a cathode 5 brush soaked with a plating solution and an anode 7 cable attached to the substrate 10 to be coated. It is a common electroplating process for oddly shaped substrate 10. This process is advantageous because it does not require an immersion bath and can be used for plating smaller volumes of material at one time, compared to the other processes described herein. In this embodiment, the at least one lens substrate 10 functions as the cathode 5 with an insulated material, as in the immersion electroplating process. At least a portion of the anode 7 may comprise at least one conductive material. The anode 7 may further comprise water-absorbent foam on one end, and the other end of the anode 7 may be connected to a power supply 9 by an insulated cable. A power of between about 1 V to about 14 V DC at a current of 0.10-4 A may be applied while the anode 7 is "brushed" across the surface of the lens substrate 10. This process causes thin layers of plating material to begin to adhere to the surface of the lens substrate 10.

Anodizing (Step 255)

As an optional step, instead of or after the electroplating/electrodeposition process (post-hard coating), anodizing can be carried out. As used herein, anodizing means the process of coating a metal with a protective oxide layer by an electrolytic process in which the metal forms the anode. In one embodiment, aluminum can be used for the anodizing process. An anodizing layer 320 could be substantially comprised of an aluminum alloy. In other embodiments, titanium, zinc, magnesium, and/or tantalum could be used within the anodizing process.

Figure 3B:
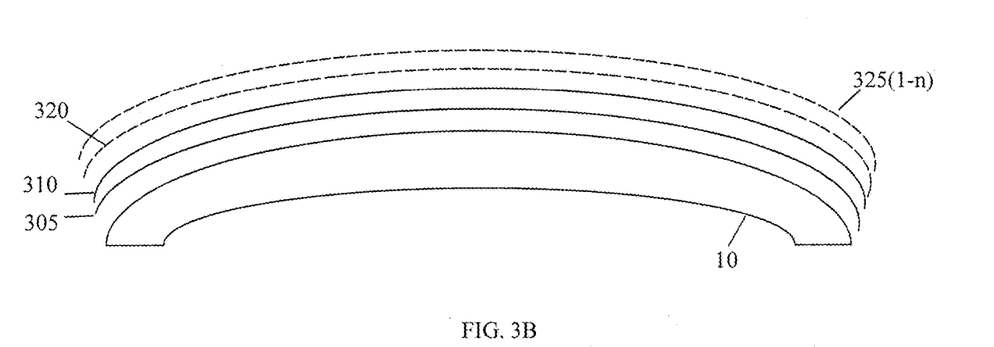
FIG. 3B shows an example of a lens substrate with various layers but without a plating layer, configured according to principles of the disclosure.

Instead of electroplating a material to the strike layer 310, the anodizing process converts Al to $Al_2O_3$, which is a strong and chemically resistant oxide layer. In other words, the strike layer 310 is the primary metal layer for this process, as shown in FIG. 3B. For this process the substrate 10 is the anode 7 and the metal container is the cathode 5. The immersion bath 3 comprises a solution of 15% $H_2SO_4$ (sulphuric acid) and acts as a conducting electrolyte. A voltage of between 10-15 volts at between about 0.25 amps to about 2 amps can be applied across the anode 7 and cathode 5 to start the oxidation reaction. This process causes a thick and porous layer of $Al_2O_3$ to form on a substantially pure layer of Al. The density and thickness of the $Al_2O_3$ layer that is formed is determined by Faraday's law, as described above, similar to the immersion process, but also compensates for the change in resistance due to the presence of an electrolytic bath.

Tinting (Step 265)

After the anodizing step, in one embodiment a tinting step can be carried out. Anodic films (i.e., films produced by the anodizing process) are well suited for tinting if the thickness and porosity of the anodized film is sufficiently high enough. The tinting process is useful for producing lens substrates 10 having a mirror coating with various tints of color. A wide variety of tinted lenses having various colors can be made. Tinting processes, such as those known in the art and commonly used for ORMA® lens substrates 10, are similar to tinting processes that could be used for anodized tinting. Organic and inorganic dyes can be used for tinting $Al_2O_3$ films. Anodizing tinting dyes and/or standard BPI tinting dyes such as those currently used for ORMA® lens substrates may be used to tint the lens substrate 10. Standard BPI tinting dyes.

For the tinting process, at least one lens substrate 10 is immersed within a heated bath 3 that comprises at least one desired tinting dye. The bath 3 can range in temperature from about 40° C. to about 80° C., depending on the type of dye used. The dyeing time varies with the brand of tinting dye and with the final color depth desired on the lens substrate 10, but typically runs between about 15 minutes and about 25 minutes. The tint intensity can be varied. To achieve light accent tints on the lenses, it may be possible to dye the lenses for as little as five minutes, while deeper or darker tints could take as long as thirty minutes.

Sealing (Step 270)

After the tinting step is carried out, a sealing step is completed to ensure the anodizing layer is strong and that the tinting dye is properly captured in the porous layers of $Al_2O_3$, for example. The sealing process occurs by immersing the at least one lens substrate 10 within a de-ionized (DI) water bath containing sealing salts (commercially available). Sealing salts are commercially available salts that are added to sealing baths for the anodizing process. Sealing salts can comprise metallic acetates such as, but not limited to, nickel, copper, cobalt, zinc, barium, aluminum, and lead. During this sealing process the DI water can have a temperature from about 25° C. to about 100° C. More particularly, the DI water can have a temperature of between about 25° C. and 30° C. ("low"); between about 60-80° C. ("mid"); or between about 90 to about 100° C. ("high"). As the temperature is increased, the sealing time is decreased. For example, at about 100° C., the sealing time can take between about 2 and 3 minutes. However, during the sealing process at high temperature, tinting dyes may leach out of the $Al_2O_3$ before it can completely seal. Sealing at mid-temperatures can take between about 10 to 15 minutes, but is less prone to leaching. Sealing at low temperatures relies more on the sealing salts than temperature and takes longer than 15 minutes, but retains the tinting color better than sealing at mid or high temperatures. During each step of the sealing process, a layer of Boehmite is formed on the surface of the $Al_2O_3$ through hydrolysis of $Al_2O_3$. This Boehmite layer creates a very smooth and scratch-resistant surface while also encapsulating at least one dye.

Electropolishing (Step 275)

Optionally, after the lens substrate 10 is plated with at least one plating layer using the electroplating process or other processes, as described above, electropolishing may be used to smooth or deburr a plating layer. Electrolytic smoothing or deburring is a commonly employed technique, especially for metallic materials. Such processes can be carried using an electrolyte containing perchloric ($HClO_4$), sulphuric ($H_2SO_4$) acid in methanol. This is performed by immersing the lens as the anode 7 instead of the cathode 5 and the non-reactive anode 7 as the cathode 5 into the immersion bath 3. The bath 3 may contain sulfuric or phosphoric acid at a concentration of between about 5 to about 15% at a temperature of 40-80° C. The electropolishing step may take less than about 2 minutes to complete.

Post-Electroplating coatings (Step 280)

After the electroplating process, one or more electroplating-compatible coatings 325 (1-n coatings) can be applied to the lens substrate 10. In one example fog-resistant coating(s) can be applied to the lens substrate 10. However, a $SiO_2$ layer may need to be applied prior to the fog-resistant coating for sufficient adhesion of the fog-resistant coating to a previously applied layer of the lens substrate 10. In general, in some applications, a $SiO_2$ layer, which may be a second layer of $SiO_2$, may be applied to provide sufficient adhesion for subsequent layers or coatings. The $SiO_2$ layer may be applied after at least one conductive layer, such as conductive strike layer 310. The $SiO_2$ layer may be applied after optional anodizing layer 320. Therefore, another PVD step would be required to add a layer of $SiO_2$ with a thickness of about 5 nm to the lens substrate 10 before treatment of the lens substrate with fog-resistant coatings, smudge-resistant coatings, or Teflon-based coatings, such as those made commercially available by Essilor. Such coatings 325 may be applied by thermal evaporation in a vacuum, dipping, or by manual wiping, for example.

The electroplating process or similar processes described herein can be scaled up and customized for automated mass production. The process can also be used for any type of ophthalmic lens, such as, but not limited to, prescription, plano, sunwear, etc. The electroplating process may be used to produce ophthalmic lenses having different colored tints, for example, gold, silver, blue, and green tints. Ophthalmic lenses can be tinted using any desired tint using this electroplating process. The primary advantage of this process is that it does not require the use of a vacuum chamber and large amounts of expensive materials for the electroplating process, thereby providing a lower-cost solution.

FIG. 3A shows an example of a lens substrate with various layers, configured according to principals of the disclosure. The example lens substrate with various layers of FIG. 3A-3C may be configured by one or more processes described above. The various layers may comprise transparent layers. In FIG. 3A, a lens substrate 10 may include a $SiO_2$ layer 305, a strike layer 310 and at least one plating layer 315. Optionally, an anodizing layer 320 may be applied. Optionally, one or more electroplating-compatible coatings 325 (e.g., a fog-coating, a smudge-resistant coating, a Teflon-based coating or a second a layer of $SiO_2$ coating) may be applied to the optional anodizing layer 320 or to the at least one plating layer 315.

FIG. 3B is similar to FIG. 3A except without a plating layer 315, configured according to principals of the disclosure.

Figure 3C:
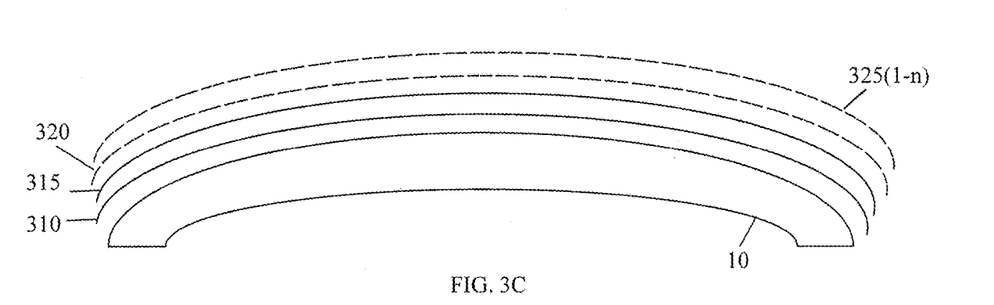
FIG. 3C shows an example of a lens substrate with various layers but without a $SiO_2$ layer on the lens substrate, configured according to principles of the disclosure.

FIG. 3C is similar to FIG. 3A, except without a $SiO_2$ layer on the lens substrate, configured according to principals of the disclosure.

The particular examples disclosed above are illustrative only, as the present invention may be modified and practiced in different but equivalent manners apparent to those skilled in the art having the benefit of the teachings herein. It is, therefore, evident that the particular illustrative examples disclosed above may be altered or modified and all such variations are considered within the scope of the present invention.

The various elements or steps according to the disclosed elements or steps can be combined advantageously or practiced together in various combinations or sub-combinations of elements or sequences of steps to increase the efficiency and benefits that can be obtained from the invention.

It will be appreciated that one or more of the above embodiments may be combined with one or more of the other embodiments, unless explicitly stated otherwise. For example, an embodiment may include an ophthalmic article comprising: an ophthalmic lens substrate having a surface, a $SiO_2$ layer applied to a surface of the ophthalmic lens, a first conductive layer formed on the $SiO_2$ layer and a second plating layer formed on the first conductive layer, such that second plating layer has a contacting relationship with the first conductive layer, wherein the second layer is deposited by at least one of the group comprising: electroplating, electroless deposition, pulse electroplating, and brush coating.

As another example, a plurality (or all) of the following steps may be performed before applying the first conductive layer to the lens substrate: de-greasing the lens substrate, pre-etching the lens substrate, etching the lens substrate, rinsing the lens substrate and applying a $SiO_2$ layer. Moreover, a plurality (or all) of the following steps may be performed after applying the conductive layer: etching the lens substrate, anodizing the lens substrate, tinting the lens substrate, sealing the lens substrate, electropolishing the lens substrate and applying a coating to the lens substrate.

The invention illustratively disclosed herein suitably may be practiced in the absence of any element or step that is not specifically disclosed or claimed.

Furthermore, no limitations are intended to the details of construction, composition, design, or steps herein shown, other than as described in the claims.

What is claimed is:

1. A method for manufacturing an optical article, the method comprising:
   providing at least one ophthalmic lens substrate having a surface;
   applying at least one $SiO_2$ layer on the surface of the at least one ophthalmic lens substrate;
   applying at least one strike layer on the $SiO_2$ layer of the at least one ophthalmic lens substrate, the at least one strike layer being a conductive transparent material that is compatible with and configured to adhere to the at least one ophthalmic lens substrate; and
   electroplating the ophthalmic lens substrate to form a plating layer that is in a contacting relationship with the conductive transparent material, the plating layer being compatible with and configured to adhere to the strike layer.

2. The method of claim 1, wherein the strike layer is applied onto the surface of the ophthalmic lens substrate by any one of the group comprising: physical vapor deposition (PVD), chemical vapor deposition (CVD), sputtering, dip coating, and spin coating.

3. The method of claim 1, further comprising immersing the at least one ophthalmic lens substrate into an immersion bath.

4. The method of claim 1, wherein the at least one ophthalmic lens substrate functions as a cathode.

5. The method of claim 1, wherein the at least one ophthalmic lens substrate functions as an anode.

6. The method of claim 1, wherein the electroplating is selected from at least one of the methods of the group comprising: electroless deposition, pulse electroplating, and brush coating deposition.

7. The method of claim 1, further comprising one or more of the following steps before applying the at least one $SiO_2$ layer:
   de-greasing the lens substrate;
   pre-etching the lens substrate;
   etching the lens substrate; and
   rinsing the lens substrate.

8. The method of claim 1, the method comprising one or more of the following steps after applying the conductive coating:
- etching the lens substrate;
- anodizing the lens substrate;
- tinting the lens substrate;
- sealing the lens substrate;
- electropolishing the lens substrate; and
- applying a coating to the lens substrate.

* * * * *